AUTOMATIC TRANSMISSION ALARM

Filed July 14, 1953 2 Sheets-Sheet 1

INVENTOR:

Anatol N. Andrews

AUTOMATIC TRANSMISSION ALARM

Filed July 14, 1953

INVENTOR:

Anatol N. Andrews

United States Patent Office 2,883,460

Patented Apr. 21, 1959

2,883,460

AUTOMATIC TRANSMISSION ALARM

Anatol N. Andrews, Los Angeles, Calif.

Application July 14, 1953, Serial No. 367,817

4 Claims. (Cl. 179—5)

This invention relates to automatic alarms, and more specifically to means of conveying an alarm to a remote point automatically, and is an automatic transmission alarm which is conceived of a new and original idea—to utilize available transmitting equipment for automatic conveyance of a distinct alarm to a remote and relatively dormant point—and incorporates a thereof inspired basic workable principle comprising the initiative in engagement of said equipment, and reducible to practical means for accomplishing afore task as will be demonstrated herein.

This invention should not be confused with the telephone call answering devices which lift telephone receiver from its base responsive to a call signal therefrom.

This invention is not a telephone call answering device. Through medium of this invention a telephone call can be initiated rather than merely answered. The latter requires a mere lifting of a telephone receiver. This invention, when used with telephone equipment, substitutes, either mechanically or electrically, the entire cycle and timing element involved in the human effort ordinarily required to initiate an outside call and to make a contact with a remote and hereto relatively domant point. Through medium of this invention the result equivalent to lifting the telephone receiver and dialing an outside number including the involved time lapses is accomplished automatically in response to causes other than a telephone call from the point where the message is aimed to be so delivered.

This invention, for instance, is susceptible of automatically causing an available telephone apparatus without any call signal therefrom to transmit to a telephone company operator or to another telephone location a recorded human voice comprising a message, for instance, of a burglary or a fire, and giving exact address and location, and of commencing to operate instantaneously at the occurance, for example, of a forced entry into the premises, and of extending the life of said message, for instance, repeating it, and of performing and/or causing said engagements to perform without warning or alarming the burglar, and of being responsive to and/or of using an electric or electronic equipment, in this exampled instance, the telephone equipment, without altering it, and also susceptible of being removably or permanently connected therewith, and/or of becoming a component thereto or thereof.

This invention may be also advantageously applied in other fields. For instance, it may be adapted to transmit automatically to a relatively dormant point and via any available transmitting apparatus and/or public conveyance system, for example, telephone, telegraph, radio, television and like, an ocular, a vocal or a physically perceivable recorded message due for transmission at a certain later time or under certain circumstances or occurrence such as in temperature, atmosphere, sound or light, water pressure or its level and like, or by means of a switch-like arrangement or in response to emanations from an outside apparatus engageable from a point or by a source other than the addressee of said message.

Thus in times of urgent emergencies it may be used to convey automatically to a remote and relatively dormant point or a plurality thereof recorded details, or instructions normally not to be given out, yet, when due, to be conveyed promptly with no time to spare for conventional means, merely at a touch of a button or automatically responsive to a certain re-action of an apparatus receptionally inducible by emanations from a source of danger.

In normal daily life, however, this invention offers new, original and comparatively inexpensive means and other great advantages over the existing methods for fire or burglar alarms, especially the latter.

Heretofore most commonly used burglar alarm methods comprised the well known electric alarm bell secured on subject premises. This bell, despite its noisy performance, is often ignored by the passers by. Those who would take the trouble to look for the nearest telephone in the effort to notify the authorities, first encounter great difficulty to accede to one during the night hours usually favored by the burglar, second—to give the exact address where the bell sound originated from since they may have heard it from other premises, or on a dark street, or passing by in an automobile.

One most likely to be warned first by such a bell is the burglar himself. Thus he has a very good opportunity to escape, frequently with loot, for repeat performances and long before arrival of the police, if any.

Despite such obvious disadvantages and meager protection the manufacture, installation and maintenance of said bell systems must be expensive to justify the substantial installation fee and high monthly rental rates charged by therein engaged organisations to their respective subscribers.

Another system now in use requires a very expensive special direct wiring from subject premises to a remote private detective agency, and calls for extremely high monthly rates evidently to maintain a constant guard at the receiving point to register an alarm and a large private staff to respond thereto.

All those systems depend solely upon a plain noise, or a sound of a buzzer, or a flick of a light. With all of said existing automatic alarm systems there is no positive assurance of immediate notification of proper authorities such as the police department.

The very present existence of the prohibitively high burglar insurance rates is the best proof of the inadequacy and/or impracticability of all heretofore available burglar alarm systems.

Subsequent to afore recital it is among the objects of this invention to provide an automatic transmission alarm which utilizes available transmitting equipment for automatic conveyance of a distinct alarm to a remote point without inducement from the latter, and incorporates a recording, a reproducing equipment, and means to engage all of said equipments in cooperating relationship automatically in response to a cause other than the proposed addressee.

Also among the objects of this invention is to provide an automatic alarm adapted to engage automatically an available communication facility for transmitting a message to a relatively dormant point in response to an inducement from another source.

Still another object of this invention is to provide a recorded message, means to reproduce it perceptively, means to signal a relatively dormant remote point, to receive said reproduction and transmit it to said point, means to actuate said signal, reception and transmission, means to actuate said reproducing, means to convey said reproduction into engaged receiver for said transmission, means to actuate said engagements automatically and in co-operating relationship, means to induce said actuation.

It is also an object of this invention, when it is used as a burglar alarm utilizing a public telephone system as means of transmitting the alarm message to a remote point, to provide a switch responsive to an unorthodox entry into premises or into a container, for instance, a switch automatically responsive to an unorthodox handling, contact or violence thereagainst or against an extension thereof, or against a direct relation thereto, and a recording of a human voice reciting event of burglary and giving its location, and a reproducing device for said recording, and a receiving and transmitting telephone apparatus, and means to engage the latter and the reproducing device automatically and responsive to engagement of afore switch, and means to cause thereafter the telephone apparatus to contact a desired, heretofore relatively dormant, outside telephone number, for instance, of the telephone company operator or of the police department, and means to cause then the receiver to receive the reproduction of the record from the engaged reproducing device and convey said reproduction into the transmitter, and, if desired, means to repeat the message into so engaged receiver and transmitter.

It is further an object of this invention, when it is used as a fire alarm utilizing the same conveyance, to likewise transmit its alarm message, to provide a substantially similar equipment and means to engage the latter, with exception, of course, that the recording should recite event of fire rather than burglary, and the outside number to be contacted may be of the fire department, though a telephone company operator would serve as well, and to substitute the afore burglary responsive switch with a fire responsive switch, for instance, a switch responsive to conditions created by fire, for example, certain degree in temperature, or a certain chemical change in atmosphere and like, or to any other peculiarities and/or characteristic changes that may occure on premises due to fire.

If it is desired to use this invention in one device as a combination of either a burglary or a fire alarm and to use the same conveyance for transmitting either of its alarm messages, it is also an object herein to provide separate recordings and reproducers for each, to provide two switches, one responsive to burglary characteristics, and the other to fire conditions, means to actuate automatically the reproducer of the burglary reporting recording responsive to engagement of the burglary switch, means to actuate automatically the reproducer of the fire reporting recording responsive to engagement of the fire switch, means to engage automatically the telephone apparatus responsive to engagement of either one of said switches, and the other hereto referred means for initiating the contact with an outside telephone number and transmitting thereto the reproduction of a recording by the actuated reproducer.

If it is desired to use this invention as means to convey a recorded message to a certain outside telephone number at a later time, it is an object herein to provide substantially the same equipment and means as in reference to its use as a burglar alarm, except for the text in the recording and the switch, the latter may be substituted by an alarm-clock-like switch automatically engageable at a certain future pre-set time.

It is further an object of this invention to provide means incorporating it in a single device to initiate transmissions of a plurality of different recorded messages to different remote points automatically and respectively responsive each to one of a dependent plurality of differently engageable for a required purpose switches co-operating with other hereto referred means subsequently extended to conform with required scope, and consequent with herein conveyed basic principles.

If an available receiving and transmitting apparatus may not be tampered with, one of the objects of this invention is to provide means to engage it automatically for an initiative transmission of a desired recorded message without altering said apparatus, for instance, as the basic idea conveying illustration, to so engage an ordinary dial telephone apparatus said means may comprise an electro-mechanical structure essentially as shown and described in reference to certain figures in the accompanying drawings.

If the original wiring in an available and similar apparatus may not be changed but entrance thereinto is permissible, it is among objects of this invention to provide a remote control means susceptible to substitute and convey into or within said apparatus automatically and without physical engagement of its regular outside controls the required therein and ordinarily engageable by said outside controls actions and re-actions of its electric switches and/or relays and sequences thereof to actuate said apparatus automatically to receive and transmit the message, and said means comprising the workable principles easily detectable from references to certain other figures in the accompanying drawings.

If a change in, and/or alterations of or to, the regular wiring and/or structure of, or pertaining to, a likewise apparatus are permissible, the objects of this invention include the consequent simplification and/or change, or a plurality thereof, in the structure, or shape, or form, and/or in contacts, and/or in engagements of means susceptible of actuating such apparatus, and/or an equipment pertaining thereto, automatically for heretofore recited performances and in response to an engagement of means provoked by a source other than the proposed addressee of a recorded message to be so transmitted.

When a limited plurality of differently located remote points are designated to receive simultaneously at a time of a certain occurance a similar and thereto altogether confidential message, it is also within the objects of this invention to provide means to engage automatically and simultaneously a dependent plurality of receiver-transmitter apparatuses, for instance, telephones, and a reproducer of said message recording, and means to cause each of said apparatuses simultaneously to contact and transmit to its respectively designated different remote point the reproduction of said message recording in automatic response to a provocation from a source other than any one of said different addressees.

It is also an object of this invention to make its various embodiments easy and inexpensive to manufacture, maintain and operate.

To show and/or convey how the afore and other objects of this invention can and may be practically achieved reference now is being made to the accompanying drawings.

In reference to the drawings.

Figures 1, 2, 3, 4:
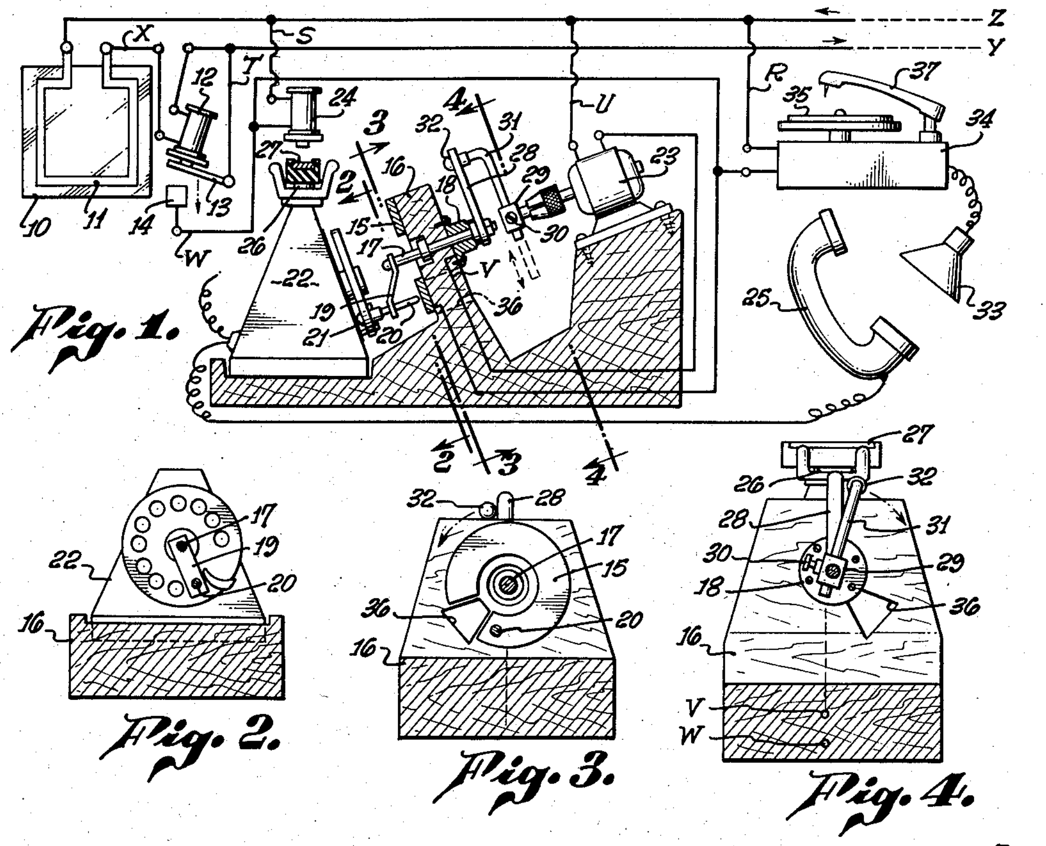
Figure 1 is a plan and a sectionally cross-sectional view of an electro-mechanical structure embodying principles of this invention and shows dependent positions of members when the actuating switch is not engaged.
Figure 2 is a sectionally cross-sectional view taken at 2—2 of Figure 1.
Figure 3 is a sectionally cross-sectional view taken at 3—3 of Figure 1.
Figure 4 is a sectionally cross-sectional view taken at 4—4 of Figure 1.

In Figure 1 a window glass 10 is shown intact and has a ribbon-like electrically conductive configuration 11 painted over the middle section of the indoor side of glass 10. Electric current is conducted via wires Z and Y from outside. One end of said painted ribbon 11 is conductively secured with one end of wire Z, and the other end of ribbon 11 is likewise secured to one end of conductive wire X. The other end of the latter is secured with one terminal of electromagnet 12. The other terminal of said magnet is secured with one end of wire Y, thus completing the electric circuit and causing magnet 12 to hold a conductive hinged bar 13 upwardly and away from a conductive block 14. The latter is secured with one end of wire W. The other end of said wire is secured with a circular horseshoe-like conductive plate 15 (Figures 3 and 1) which is stationary held in a dependent position to the lower face of a protruding at a dependent angle branch of wooden block 16. A conductive round rod 17 is axle-like secured in a dependent position nonconductively through the hollow middle section of plate 15 and wooden body of said branch of block 16 and conductively with and through a metal frame 18. The latter is stationary secured in a dependent position to the upper face of afore branch of wooden block 16. A flat and flat-side resilient steel spring 19, with its flat side facing plate 15, is conductively and perpendicularly and stationary secured by one of its end-sections with lower end-section of rod 17 at a distance from plate 15. The other end-section of spring 19 is likewise secured with a middle section of a pencil-shaped metal rod 20. The upper, tapered, section of the latter is of a dependent length adapted to engage downwardly spring 19 in order to assume the shown dependent position against plate 15. The lower end-section of rod 20 is covered with hard, smooth and slippery insulation 21 and is loosely inserted into a dial hole of a dependently close telephone apparatus 22. Said dial hole may be the one ordinarily used by a finger to dial the telephone company operator (Figure 2). The tapered end-section of rod 20 is conductive. Because of its said dependent length and its said engagement against spring 19, its tapering end will press conductively against the surface of plate 15. One end of wire V is conductively secured with the metal frame 18, and the other end of said wire is likewise secured with one terminal of an electric motor 23. The other terminal of the latter is conductively secured with circuit wire Z via wire U. The hinged end of bar 13 is conductively secured with the middle section of circuit wire Y via wire T. Thus, as long as bar 13 remains pulled up by engaged magnet 12 and so disconnected from block 14, the electric motor 23 will remain dormant. Another electromagnet 24 is stationary secured in a dependently distant position over and above telephone apparatus 22, and has one terminal conductively secured with middle section of circuit wire Z via wire S, and the other terminal with middle section of wire W, and thus also will remain dormant as long as bar 13 is disconnected from block 14. Telephone receiver 25 may be removed as shown from its regular hold over the telephone weight-switch 26, and substituted by an insulated steel bar 27 of equal weight which will keep telephone 22 disconnected until bar 27 is lifted by magnet 24. An elongated bar 28 is perpendicularly and stationary secured in a dependent position by its lower end to the upper end of the axle-like rod 17. A T-shaped pipe piece 29 is stationary secured as shown with axle of motor 23 and has a lock screw 30. An L shaped bar 31 has its longer arm inserted slidingly through pipe 29 and perpendicularly to axle of motor 23, and is stationary securable in pipe 29 in a dependent position by screw 30. The end-section 32 of the shorter arm of bar 31 is insulated and, if motor 23 turns clockwise, brought originally into a dependent position adjacent to bar 28 and therebehind so that, when motor 23 is engaged, it will have to turn around before it starts turning the axel-like rod 17 via said bar 28. The time required for the end 32 to turn for said contact should correspond with time ordinarily required between the manual lifting of telephone receiver and appearance of the buzzing sound indicating readiness for the start of the finger dialing, and can be here properly co-ordinated by adjusting the extension of the longer arm of rod 31 from pipe 29 in relation to the speed of motor 23. In the shown structure the speed of motor 23 by itself not always may be co-ordinated with afore required speed-time to start turning the end 32, since the speed required in this structure from motor 23 primarily depends upon the radius of the telephone dial and thus upon the thereon dependent length of spring 19 in order to imitate the time ordinarily required for the average manual dialing, on the other hand the time between lifting the telephone receiver and appearance of the buzzing sound may differ. After those required ratio relationships are here mechanically duly established, provided and secured, the telephone receiver 25 is placed near speaker 33 of the record reproducer 34. One electric terminal of the latter is conductively secured with middle section of circuit wire Z via wire R, and the other terminal with middle section of wire W, thus reproducer 34 also will remain dormant until rod 13 contacts block 14. A burglary and location conveying message is recorded on disk 35 placed in readiness for engagement in reproducer 34 and, if desired, may have such message recorded repeatedly, or the reproducer 34 may be of the type that once actuated repeats re-engagement of a record automatically until stopped. Wooden block 16 has a hole 36 (Figures 3 and 4) through its aforesaid protruding branch and between the horseshoe-like break in plate 15.

Figure 5:
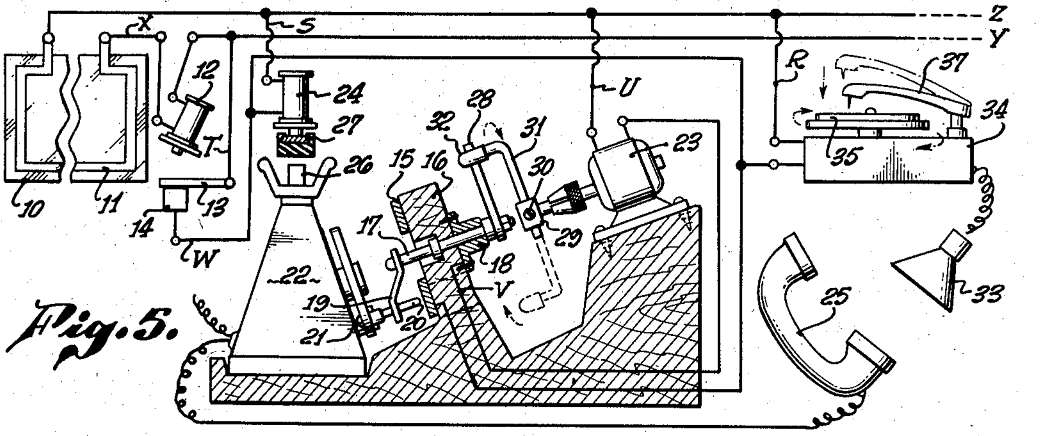
Figure 5 is a substantially similar view as in Figure 1 and shows some of the members in the course of action consequent to engagement of the actuating switch.

In Figure 5 the window glass 10 is shown broken. Such break will cause the same in the conductive ribbon-like painting 11, which would shut off the flow of electric current through magnet 12 thus letting bar 13 drop to and over block 14 and establish new electric circuits for the current through magnet 24, motor 23 and reproducer 34 simultaneously. Consequently magnet 24 will immediately pull and lift the weight 27 from the telephone weight switch 26 thus engaging telephone 22 to establish contact with telephone company for eventual receipt of the buzzing signal which normally follows within few seconds thereafter. In the meantime the axle of motor 23 will start turning rod 31 and its end 32, first away from rod 28 and then towards it from the other side. Within few seconds it will bring end 32 against loose end of rod 28 to engage rotatably via the latter the axle-like rod 17, the flat spring 19 and the rod 20. As soon as it happens the end 21 of rod 20 will start dialing the telephone dial as if it was done by a human finger. In the meantime the actuated reproducer 34 will set in motion its needle arm 37, and within the customary few seconds said arm will engage record 35 to start reproducing the message via speaker 33.

When the turning rod 20 will reach the proximity of the finger stop of the telephone dial the tapered end of said rod 20 will reach hole 36 in the wooden block 16 and then assume momentarily a dependent position thereover. Thus, the plate 15 no longer supporting said tapered end of rod 20, the latter will be forced upwardly and sectionally into hole 36 by heretofore engaged and now released resiliency of spring 19. This motion of rod 20 will automatically pull its insulated end 21 from the telephone dial hole allowing the dial to spin back to its starting position and thus to complete the call to and contact with the telephone company operator (Figures 6 and 7) while by then speaker 33 starts sending the sound reproduction of the recorded message from record 35 into the telephone receiver 25 while the telephone company operator would be listening and capable of conveying the message immediately thereafter to the police department. When tapered end-section of rod 20 is forced into hole 36, rod 20 is automatically disconnected from plate 15 breaking the electric circuit of motor 23 only and thus causing the latter to stop, while the engagements of magnet 24 and reproducer 34 will continue. Speaker 33 and receiver 25 may be enclosed in a soundproof cabinet or the entire structure may be located in a remote place on the premises so that the burglars would have no opportunity to know or to hear that while they are committing burglary the police has been contacted and is on its way to catch them in the very act of crime. The very existence on the market of such relatively inexpensive and simple device should discourage the burglars even to make an effort and so should be instrumental in reducing the present prohibitively high burglary insurance rates.

Inasmuch as shown device calls for no alterations in the telephone apparatus and/or telephone company equipment, the telephone companies, in the opinion of the inventor, should have no legal objections thereto especially since their telephone books instruct public to dial their operator in an emergency pertaining to fire or burglary.

Figures 6, 7, 8, 9:
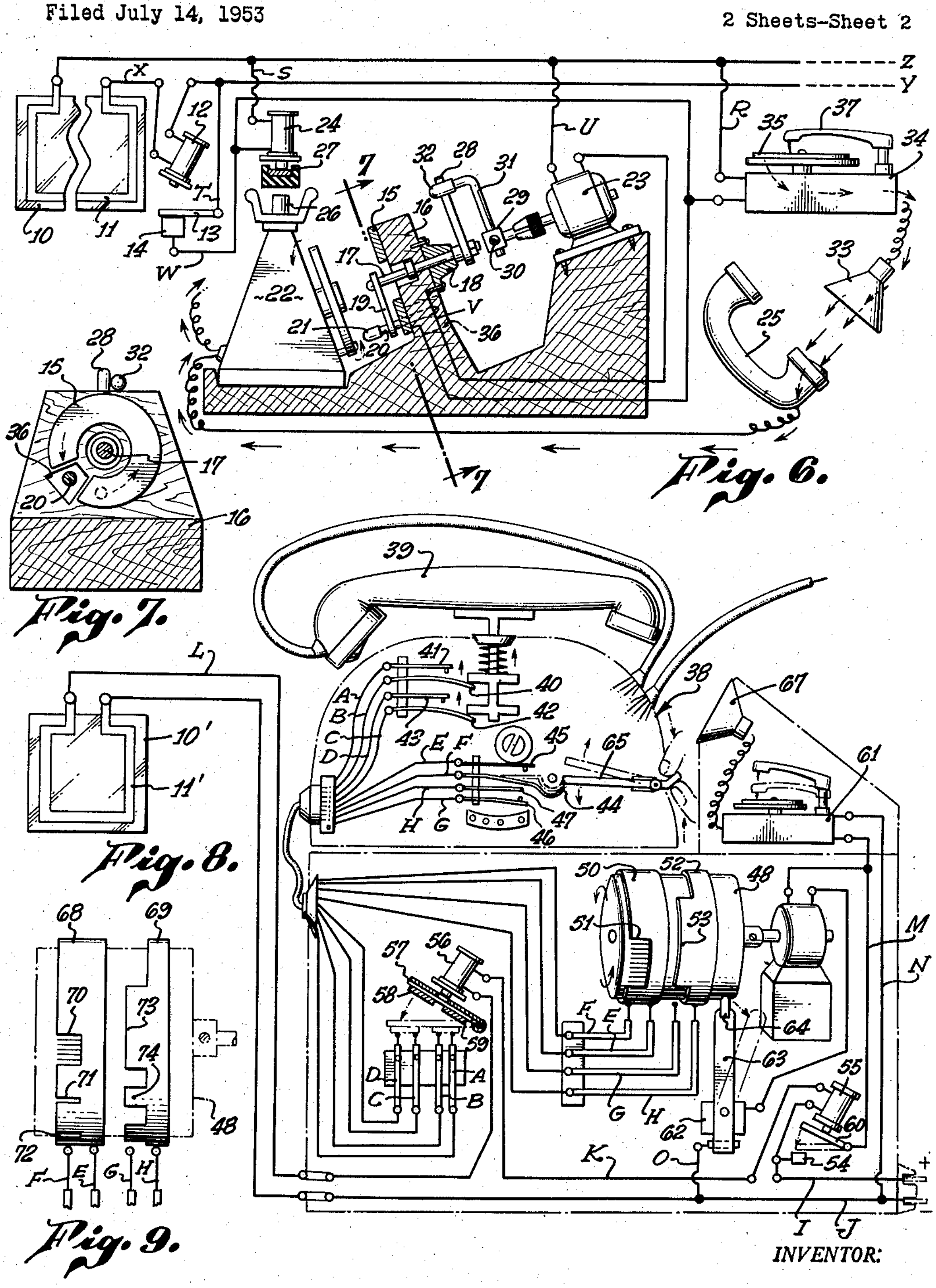
Figure 6 is a like view as in Figures 1 and 5 and shows the consequence of completed engagement of mechanical members.
Figure 7 is a sectionally cross-sectional view taken at 7—7 of Figure 6.
Figure 8 is a plan and a sectionally cross-sectional view of an electrically operated structure embodying principles of this invention.
Figure 9 is a plan view of members illustrating further susceptibility of this invention.

If arrangements may be made with said companies resulting in permission to enter their telephone apparatus but not to change any existing therewithin wirings, Figures 8 and 9 demonstrate how the principles of this invention may be further adapted.

In Figure 8 relatively more complicated than average switch engagements in a telephone apparatus are purposely shown for said demonstration. Here the shown telephone apparatus 38 is assumingly connected for regular engagement together with one of their conventional extension apparatuses placed somewhere on the same premises. If such is the case, when telephone receiver 39 is lifted two telephone electric contacts occur simultaneously and instantaneously within apparatus 38. Their terminal 40 contacts terminal 41, and their terminal 42 contacts terminal 43. Their terminal 44 remains in contact with terminal 45, and their terminal 46 remains disconnected from terminal 47. At the instance the dial is manually engaged to dial a number the terminal 46 contacts terminal 47 and remains so contacted until the dial returns to its original position. Thereafter terminal 46 disconnects from terminal 47. While the dial spins back to the original position from the point of the dial finger stop, the terminal 44 pulsates (connects and disconnects) from terminal 45 a certain number of times dependent upon the finger hole in the dial the latter was engaged by. For instance, in the case demonstrated in Figure 6 the dialing pertains to contacting the telephone operator. For that purpose the tenth finger hole in the dial would have been used manually. Resultant of such engagement of the dial the terminal 44 would pulsate (disconnect and connect) ten times from terminal 45 while the tenth hole of the dial is returning back with the backwardly spinning dial to its original position from the point of the dial finger stop. In order to demonstrate how through principles of this invention said telephone apparatus may be engaged automatically by entering its container yet without changing any existing telephone company's wirings therein a nonconductive, for instance, wooden, circular rod 48 is secured with axle of an electric motor 49. A metal ring 50 having on one side thereof a comb-like cut-out 51 with nine protruding teeth is stationary secured in a dependent position over one side of rod 48. At a distance from ring 50 over the other side of rod 48 is likewise secured a relatively narrower ring 52 having protuberance 53 which is twice longer than the length of comb 51 of ring 50. The lower edge of comb 51 is in line with the lower edge of protuberance 53. Outside electric current is supplied via wires I and J. Loose end of the latter is secured with one terminal of conductive ribbon 11' painted over indoor side of window glass 10'. Loose end of wire I is secured with a terminal of conductive block 54 and with one terminal of electromagnet 55, the other terminal of the latter is secured with one terminal of another electromagnet 56 via wire K. The other terminal of magnet 56 is secured with the other terminal of ribbon 11' via wire L, completing the circuit and causing engagements of magnets 55 and 56. A nonconductive hinged bar 57 has two separate and dependently smaller steel plates 58 and 59 secured thereto thereunder and because of said magnetically responsive plates is pulled upwardly by magnet 56 away from terminals of wires A, B, C and D thereunder. A steel hinged bar 60 is likewise pulled by magnet 55 away from block 54 and has its hinged end conductively connected with one electric terminal of the record reproducer 61 and with one terminal of motor 49 via wire M. The other terminal of reproducer 61 is secured with circuit wire J via wire N. The other terminal of motor 49 is secured with a terminal of a conductive block 62. An elongated, hinged and conductive plate 63 is conductively and removably leaning against block 62 and has its hinged end conductively connected with circuit wire J via wire O, thus completing electric circuit for motor 49 if bar 60 was in contact with block 54. A protuberance 64 extends in a dependent position from rod 48, is nonconductive and is adapted for engagement against loose end of the leaning plate 63 to throw the latter away from block 62 when said protuberance 64 is brought thereagainst from behind through medium of rod 48 rotation when said rotation is actuated by the axle of motor 49. Terminals of wires F, E, G and H are dependently and separately secured in the proximity of rings 50 and 52 thereunder. When rod 48 is in shown dependent position the solid section of the comb-side of ring 50 slidingly contacts terminal of wire F. The opposite and altogether solid side of ring 50 likewise and permanently contacts terminal of wire E. In the shown position the protuberance 53 of ring 52 does not contact the terminal of wire G, however it will, slidingly, when and while it turns directly thereover with rod 48. The opposite side of ring 52 slidingly and permanently contacts terminal of wire H. The other respective ends of otherwise insulated from each other wires A, B, C, D, E, F, H and G are brought into the telephone apparatus 38, are here separated and respectively and conductively connected therein with the exposed and easily accessible terminals 41, 40, 42, 43, 45, 44, 47 and 46, as shown. Elongated nonconductive rod 65 is manually engageable or disengageable by a finger from outside against the loose end of the upwardly resilient telephone terminal 44 to either move and keep the latter slightly downwardly away from its contact with terminal 45, or to let it return to its original position and contact. Rod 65 does not need to be secured to or with terminal 44 as indicated, and does not change the structure or conventional operation of the telephone when disengaged, and, when engaged, after the aforesaid connections of the brought in wires have been made and the device members are in the described dependent positions, will not change the status of the telephone terminal switch relationships since by then the terminal 45 is already in contact with terminal 44 via wires E and F which are conductively connected with each other through medium of the conductive bridge formed by the solid section of ring 50 therebetween.

Before leaving so equipped premises the rod 65 should be engaged, upon legitimate arrival to the premises said rod may be disengaged which would allow regular use of telephone 38 while the premises are normally occupied. However, if an extra telephone apparatus is used for the purpose, rod 65 may be left engaged permanently, or a substantially similar engagement may be substituted by any other suitable means, for instance, a piece of insulating tape secured between terminals 45 and 44 and easily removable if the telephone apparatus is eventually reclaimed for ordinary use. In such case rod 65 or any other likewise adapted switch may be altogether eliminated making it unnecessary to even alter or tamper with the shell of the telephone apparatus since the customary opening thereinto for the regular telephone cord provides enough room to lead in the additional device wires A, B, C, D, E, F, H, G which evidently can be sufficiently thin for the purpose.

As long as glass 10' remains intact and the electric current is being supplied as described, the device will otherwise remain dormant. If, however, glass 10' and consequently ribbon 11' are forcibly broken or cut, the electric current through magnets 55 and 56 evidently will stop automatically. Rod 60 will drop down and contact block 54 thus engaging simultaneously the record reproducer 61 and the electric motor 49. At the same time rod 57 will drop down and thus the plate 58 will establish contact between wires D and C, and the plate 59 will establish contact between wires A and B. These two contacts will automatically substitute the re-action caused if the telephone receiver 39 was lifted. While the latter is waiting for the buzzing sound, rod 48 will start turning carrying the already discontacted from wire G protuberance 53 still farther away from its prospective contact with the terminal of said wire, and the comb 51 from its prospective ten pulsations (ten discontacts) with terminal of wire F which pulsations will occur eventually when the latter terminal is caused to be brought successively into the nonconductive distances between the comb-teeth due to rotation of rod 48. The diameter of rod 48 is co-ordinated with speed of motor 49 so that the dependent turn of rod 48 would occupy the length of time required usually for occurrence of the telephone buzzing sound after a telephone receiver is manually lifted, or, as in this case, the equivalent thereof is electrically substituted. The length of the upper section of protuberance 53 (beyond comb 55) is dependent upon the diameter of rod 48 and its rotation in respect to the terminal of wire G and the time required for said section to travel in contact therewith when said section is turnably being brought thereby. Such time should equal approximately the time which would be required, for instance, to dial manually the tenth hole of a telephone dial to the finger stop.

Since such time length often approximates the time length required for said tenth hole to spin back to its starting position, the length of said upper section may be approximately the same as the length of its lower section, and the latter must be of the same length as the length of comb 51 since the terminal of wire G must break contact with protuberance 53 the moment comb 51 completes its travel over the terminal of wire F.

Shortly thereafter the continuing turning of rod 48 will bring its protuberance 64 against upper end of plate 63 and throw the latter away from block 62 thus automatically breaking the electric circuit of motor 49 only and causing rod 48 to stop after being so returned to its approximate original position and after causing the telephone company operator to become connected and contacted to listen to the continuous and repeating reproduction of the message recording by so actuated and remaining continuously engaged reproducer 61 and via its speaker 67 and the telephone receiver 39. The latter remains physically untouched yet engaged and connected electrically through one of the mediums of this invention.

Figure 9 illustrates how through a similar medium other telephone numbers may be likewise engaged. Here metal rings 68 and 69 are adapted for and engaged substantially as rings 50 and 52 respectively in Figure 8, except that ring 68 has a relatively shorter comb 70 with only five teeth which provides six nonconductive slots. At a dependent distance downwardly from comb 70 is a similar but single slot 71, and at a likewise distance downwardly from the latter another similar single slot 72. Correspondingly ring 69 has protuberance 73 approximately twice longer than comb 70, and protuberances 74 and 75 respectively and approximately twice wider than related thereto slots 71 and 72 of ring 68. Thus, for instance, if rings 68 and 69 were used in place of rings 50 and 52 in the engagement described in reference to Figure 8, the telephone number connected would have been "611" instead of the telephone number of the telephone company operator. As illustration, number "611" may be the number of a police department or its nearest branch. Therefore by providing a different dependent quantity and arrangements of slots in the wider ring, and corresponding quantity and arrangements of protuberances in the narrower ring any desired listed telephone number may be reached automatically through a similar medium of this invention.

From afore disclosure a mere mechanical skill would be able, for instance, to incorporate similar principle for automatic contact of an outside telephone number in a more compact structure susceptible of easy embodiment within a telephone apparatus itself. If the latter was to be used only in connection with this invention, further compactness may be likewise achieved by eliminating the telephone receiver in its present shape and substituting therefore a mere essence thereof of evidently much lesser size which would allow its embodiment within (instead of outside) said single encasement. Likewise the dial, the dial mechanism, the receiver holder, the weight switch, all could be eliminated contributing again to said compactness. Further exercise of said skill could substitute, for instance, the regular electric motor, like motor 49, with smaller means, for instance, as used in some electric clocks. Likewise the rings which here help to imitate the pulsations could be substituted with, for instance, a relatively much smaller, lighter and easier to engage wire configurations, the motive means turning the reproducer could be utilized and combined to engage together and shut off separately the transmitter actuator, and so forth. An organization with proper facilities, for instance, a telephone company, can easily employ said facilities and the mechanical skill of their technicians to embody the herein disclosed principles of this invention in a still simpler structure, for instance, connect with their own wirings or embody therewithin the means actuating automatically the outside contact instead of wiring said means to only the exposed terminals in the apparatus itself.

The reason for repeatedly referring herein to a public telephone for an example or illustration is because to actuate the latter equipment for the purpose of this invention is evidently more difficult, than, for instance, telegraph equipment for transmission of a physically perceptible recorded message, or television equipment for an ocular recorded message cuttable into a program on an automatic signal from the source, or radio equipment for a vocal recorded message likewise insertable into a program.

To actuate automatically a sequence of operations and/or electric re-actions, especially when uneven timing in said sequences is involved, or to imitate and/or substitute electrically or mechanically certain series of manual manipulations, while being further handicapped by certain legally imposed restrictions, necessarily calls for more intricate practical means, herein shown, described and demonstrated, than mere means to actuate or imitate automatically a turn of a switch or even a plurality thereof especially when a required alteration within the subjected equipment is permissible.

One of the objects herein for describing and showing in minute details said relatively more intricate means coping with instances of the most difficult existing circumstances for application of this invention is to make it simpler and easier for those mechanically skilled and in possession of proper authority for access into the core of the equipment to engage here disclosed workable principles by any practical means as long as the latter are susceptible of embodying this invention and thus regardless of their shape, form, application, field or relationship and/or connection with any transmitting equipment, apparatus or system, or a combination thereof.

Therefore, while the basic principles of this invention are herein shown, described and indicated, and their workability is herein proven and demonstrated, it is and will be clearly understood, of course, that variations within the scope of accompanying claims may be resorted to without jeopardizing this patent protection, and that the various details of constructions and applications may be varied through a wide range without departing from the principles of this invention as described in one or more of following claims, and it therefore not the purpose to limit the patent granted hereon otherwise than necessitated by the said scope of the appended claims.

I claim as my invention:

1. An automatic transmission alarm device for use with a dial telephone instrument connected with a telephone system and an automatic alarm system incorporating an alarm circuit and an alarm relay and alarm contact operated by the alarm producing disturbance, a vocal record, an electrically driven record reproducer for reproducing said record into telephone receiver, and said device compising electrically operated means for automatically closing the transmitter switch in said telephone instrument, an electric motor, operative circuits for said means the motor and the record reproducer and controlled by said alarm relay, a base for holding the telephone instrument in secured position, an electromagnet secured over and higher than said instrument in said base and adapted for lifting a susceptible weight substantially as of the telephone receiver and further adapted as said means for closing the telephone transmitter switch when the latter is held open under and due to the pressure of such weight, a circularly conductive plate stationary secured opposite the telephone instrument finger wheel, a turnable conductive axle secured in alignment with the axle of said finger wheel opposite and free from the latter and insulated from afore plate, a flat conductive spring perpendicularly secured to and with said turnable axle and normally parallel and opposite to and at a distance from said finger wheel and therebetween and the afore plate, a nonconductive finger secured perpendicularly to the flat side of said spring and protrudingly therefrom towards said finger wheel for engaging one of its finger holes when pressed thereinto and normally approximately parallel to said turnable axle, a conductive pin secured to the opposite flat side of said spring protrudingly towards and against the conductive plate and further adapted for holding the loose section of said spring outwardly against its resilient resistance and towards the finger wheel and for pressing the loose end of afore finger into a finger wheel hole, and said plate terminates correspondingly opposite a proximity of the finger stop in the telephone dial, and said axle, spring, pin and plate are parts of the operative circuit for said motor, means to mesh the turnable axle with the axle of the motor after the latter axle makes a predetermined turn, and the predetermination of said turn and the turning speed of the motor are coordinated for delaying the turning engagement of said dial turning axle to provide the waiting period required for the occurrence of the dial tone in the telephone instrument subsequent to closing of its transmitter switch.

2. A device for automatic transmission of a recorded vocal alarm message through a conventional dial telephone apparatus in a telephone system, which device does not tap and does not otherwise tamper the usually insulated telephone line wires, and which device reduces to practice automatically the concept of waiting for dial tone in said apparatus subsequent to closing of its transmitter circuit and prior to dialing, and which device comprises removable means for neutralizing from each other without altering the pulse contacts within said apparatus, a plurality of insulated from each other conductive wires adapted for inserting into said apparatus through its cable hole for having their respective end sections conductively and removably secured to the respective transmitter switch terminals and dial terminals in said apparatus, and the loose end sections of said wires are respectively adapted for conductive contact engagements with other members in this device for closing remotely said telephone apparatus transmitter switch and closing and opening the dial contacts, and respective pairs of said wires are adapted as respective operative circuits for said switch and said dial contacts, an alarm circuit and alarm relays and alarm contacts operated by the alarm producing disturbance, a vocal record, an electrically driven record reproducer for reproducing said record into telephone receiver, an electric motor, operative circuits for said reproducer and said motor controlled by the first of said alarm relays, and the second alarm relay controls the afore transmitter switch operative circuit, a turnable nonconductive drum driven by said motor and having a pair of conductive rings circularly secured thereover and separated from and parallel to each other, and one edge of the first ring is widthwise sectionally recessed and sectionally protruding, the recess is circularly relatively longer than the adjacent thereto protuberance, and a section of one edge of the second ring is widthwise recessed and protruded comb-like and said comb-like section of the second ring is aligned with a section of circular length of protruding section of the first ring, the conductive terminals of afore extended dial circuits are aligned widthwise against said rings, the first terminal of the first of said circuits against the circularly continuous section of the first ring for continuous circular contact therewith, the second terminal of said first circuit against a drum section which is circularly in line with the protruding section of said first ring and for contact with the latter after the drum makes a predetermined turn, the first terminal of the second of said circuits against the circularly continuous section of the second ring for continuous circular contact therewith, the second terminal of said second circuit against a nonrecessed section of the second ring, which section is circularly in line with its said comb-like section, and for closing said second circuit until said comb-like section turningly meets said second terminal after a predetermined turn of the drum, and said predetermined turn of the drum of cooperation with the turning direction and predetermined turning speed of said motor are adapted for delaying a predetermined length of time the dialing pulsations actuated when the latter terminal engages with said comb-like section, and said delay is adapted for providing automatically the required waiting period for occurrence of the dial tone in the telephone apparatus subsequent to closing of its transmitter switch, means to stop the rotation of the drum automatically after a predetermined turn thereof.

3. For an automatic transmission device in connection with a dial telephone and an alarm system, a nonconductive drum adapted for turnable engagement in said device and having two conductive rings circularly secured thereover and separated from and parallel to each other, and one edge of the first ring is widthwise sectionally recessed and sectionally protruding, the recessed section being circularly longer than the respectively adjacent thereto protruding section, and a section of one edge of the second ring is widthwise recessed and protruded comb-like, and said comb-like section of the second ring is aligned with a section of circular length of protruding section of the first ring.

4. For a turnable nonconductive drum in an automatic transmission device in connection with a dial telephone and an alarm system, a first conductive ring adapted for being circularly secured over a circular section of said drum and having one edge sectionally widthwise recessed and sectionally protruding, the recessed section being circularly longer than the respectively adjacent thereto protruding section, and the second conductive ring adapted for being circularly secured over another circular section of said drum parallel to the first ring and separated therefrom and having a section of one edge thereof recessed and protruding widthwise comb-like.

References Cited in the file of this patent

UNITED STATES PATENTS

| | | |
|---|---|---|
| 1,627,612 | Luse | May 10, 1927 |
| 1,974,551 | Tuscher et al. | Sept. 25, 1934 |
| 2,161,525 | Mountstephen | June 6, 1939 |
| 2,498,613 | Talbot | Feb. 21, 1950 |
| 2,555,714 | Talbot | June 5, 1951 |